United States Patent
Zuzuly

[11] Patent Number: 6,141,198
[45] Date of Patent: *Oct. 31, 2000

[54] SOLID STATE OVERLOAD RELAY

[75] Inventor: Daniel Zuzuly, Geneva, Ill.

[73] Assignee: Siemens Energy & Automation, Inc., Alpharetta, Ga.

[ * ] Notice: This patent is subject to a terminal disclaimer.

[21] Appl. No.: 09/360,907

[22] Filed: Jul. 26, 1999

Related U.S. Application Data

[63] Continuation of application No. 08/891,004, Jul. 10, 1997.
[51] Int. Cl.[7] .................................................. H02H 3/00
[52] U.S. Cl. .......................... 361/93.4; 361/94; 361/115
[58] Field of Search ............................ 361/93.4, 94, 115, 361/71, 72

[56] References Cited

U.S. PATENT DOCUMENTS 5,179,495  1/1993  Zuzuly ..................................... 361/94

Primary Examiner—Stephen W. Jackson

[57] ABSTRACT

A self-powered multiple phase circuit protection device including a plurality of current transformers connected in parallel with each other and associated with one phase of a multiple phase load for providing signals representative of the current flowing in an associated phase. A first switch can be actuated to interrupt power to the multiple phase load, and a fault determining circuit is connected to the circuit transformers and to the first switch for actuating the switch during at least one predetermined condition of the current signals. A second switch can be automatically actuated to reconnect power to the multiple phase load. The fault determining circuit has a timer for delaying the actuation of the first switch, and a warning signal can be issued prior to actuation of the first switch so that the user can take corrective action.

20 Claims, 4 Drawing Sheets

SOLID STATE OVERLOAD RELAY

This application is a continuation of U.S. application Ser. No. 08/891,004, filed Jul. 10, 1997.

FIELD OF THE INVENTION

This invention relates to electrical overload relays and more specifically, to a solid state, multiple phase overload relay.

BACKGROUND

Overload relays are electrical switches typically employed in industrial settings to protect electrical equipment from damage due to overheating in turn caused by excessive current flow. In a typical case, the electrical equipment is a three-phase motor which is connected to a power source through another relay commonly referred to as a contactor. The contactor is controlled by another switch which is typically remotely located.

In a conventional setup, an overload relay is connected in series with the control switch for, in turn, control of the contactor. When an overload condition is detected by the overload relay, the overload relay operates the switch which, in turn, de-energizes the contactor which cuts the source of power to the electrical equipment, thereby preventing damage to the equipment.

In the past, overload relays have utilized resistive heaters for each phase which are in heat transfer relation with a bimetal element, which in turn controls a switch. When an overload is sensed, as, for example, when there is sufficient heat input from the resistive heater to the bimetal element, the bimetal element opens its associated switch to de-energize the contractor coil and disconnect the associated piece of electrical equipment from the source of power.

More recently, the resistive heater-bimetal element type of relay has been supplanted by electrical overload relays. See, for example, commonly assigned U.S. Pat. No. 5,179,495 issued Jan. 12, 1993, to Zuzuly, the entire disclosure of which is herein incorporated by reference. Outputs of such circuitry typically are relatively low power and, as a consequence, in order for the output to control the-contactor coil current, an electrical-mechanical switch may be required.

In one case, an overload relay, once tripped, will remain in an open position, preventing the flow of current to the contactor, and must be manually reset. Usually, a push button is employed so that an operator may push the push button to cause a reset of the system, closing the contacts of the overload relay to again allow current to flow to the contactor coil which in turn will close the contactor contacts and provide current to the electrical equipment.

During periods of overload, prior art overload relays typically trip after the overload has occurred for a period of time. This delayed trip helps prevent nuisance tripping during minor fluctuations or noise in the signals. However, these relays typically do not issue a warning or alarm during the interim period between initial detection of an overload and the tripping of the relay. Consequently, the user is unaware that overloads are occurring and cannot take corrective action to prevent tripping.

During periods of phase loss, prior art relays typically trip after there has been a phase loss for a relatively short period of time. However, prior art relays use RC timing circuits to determine these delay intervals. Since RC timing circuits are susceptible to heat and humidity changes, the RC time constant can vary with these changes, which can lead to nuisance or false relay trips, which, in turn, can damage the motor.

SUMMARY OF THE INVENTION

It is desirable to provide an overload relay that will automatically reset after it has been tripped. In such cases, an automatic reset circuit will periodically send a reset signal to a trip mechanism to reset the relay automatically without manipulation of a reset push button or similar mechanism.

It is also desirable for an overload relay to provide an overload warning signal or phase loss warning signal prior to tripping of the relay. This warning can notify the user that an overload or phase loss has occurred and allows for corrective action to be taken before the motor is shut down.

In addition, it is desirable for an overload relay to use accurate timing circuits that are less susceptible to variations in temperature and humidity.

It is also desirable to provide a reliable and accurate overload relay in a small package that can be economically manufactured.

Moreover, it is desirable to provide an overload relay that can be accurately set to trip at selected overload values.

The present invention provides a new and improved solid-state overload relay. In a preferred embodiment, the relay monitors a three-phase load, typically a motor. The overload relay includes a plurality of current sensing circuits, each associated with a phase input to the load, to provide a signal representative of the current to the respective phase input. Summing means are provided for receiving those signals and providing a signal related to the average current to the phase inputs. A power supply is operative to provide a reference signal and an RC circuit is connected to the summing means. A comparator is connected to both the reference signal and the RC circuit for comparing a signal from the latter to the reference signal and providing an overload signal when the average current signal is indicative of an overload. A switch is responsive to the overload signal and is adapted to be employed to interrupt the flow of power to the load with which the overload relay may be associated.

Preferably, the power supply is connected to the current sensors to receive electrical power therefrom. Preferably, the current sensors are current transformers and are connected with each other in parallel and in turn connected in series with the power supply and input thereto.

Preferably, a voltage clamping device is connected between the current transformer and the power supply. In a preferred embodiment, the clamping device is a zener diode. In one embodiment, a power dump circuit is connected to the voltage clamping device to reduce the power dissipation in the same.

Preferably, the overload relay of the present invention comprises fault detection circuitry connected to the current sensing devices, specifically, circuit transformers, and to the summing means for sensing the loss of a phase at any one of the phase inputs. Preferably, said circuitry comprises a plurality of comparators, one for each phase of the load, and an input circuit is provided for each comparator. Each input circuit is connected to a corresponding current sensing circuit to receive the current signal for the associated phase and to the summing means to receive the average current signal and provide a signal related to the sum thereof to the corresponding comparator.

In a preferred embodiment, digital pulse extender circuits are interposed between the comparators and the switch, and convert pulse trains from the comparators to DC signals to indicate if current is present in the corresponding leg. The digital pulse extender circuits are connected to a digital phase loss timer that issues a phase loss signal after a loss of phase has been detected for a predetermined period of time. This prevents the relay from being tripped during minor fluctuations or noise in the signals.

According to another facet of the invention, overload and phase-loss warning circuits are provided to issue a warning signal when an overload or phase loss condition is detected. In most instances, since there is a delay between an initial overload or phase loss condition and tripping of the relay (so as to prevent nuisance trips), these warning signals are issued prior to the tripping of the relay, and can therefore warn the operator that an overload or phase loss has occurred, thereby allowing the user to take corrective action prior to tripping.

Other advantages will become apparent from the following description taken in connection with the accompanying drawings.

DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principals of the invention.

DESCRIPTION OF THE PREFERRED EMBODIMENT

Figure 1:
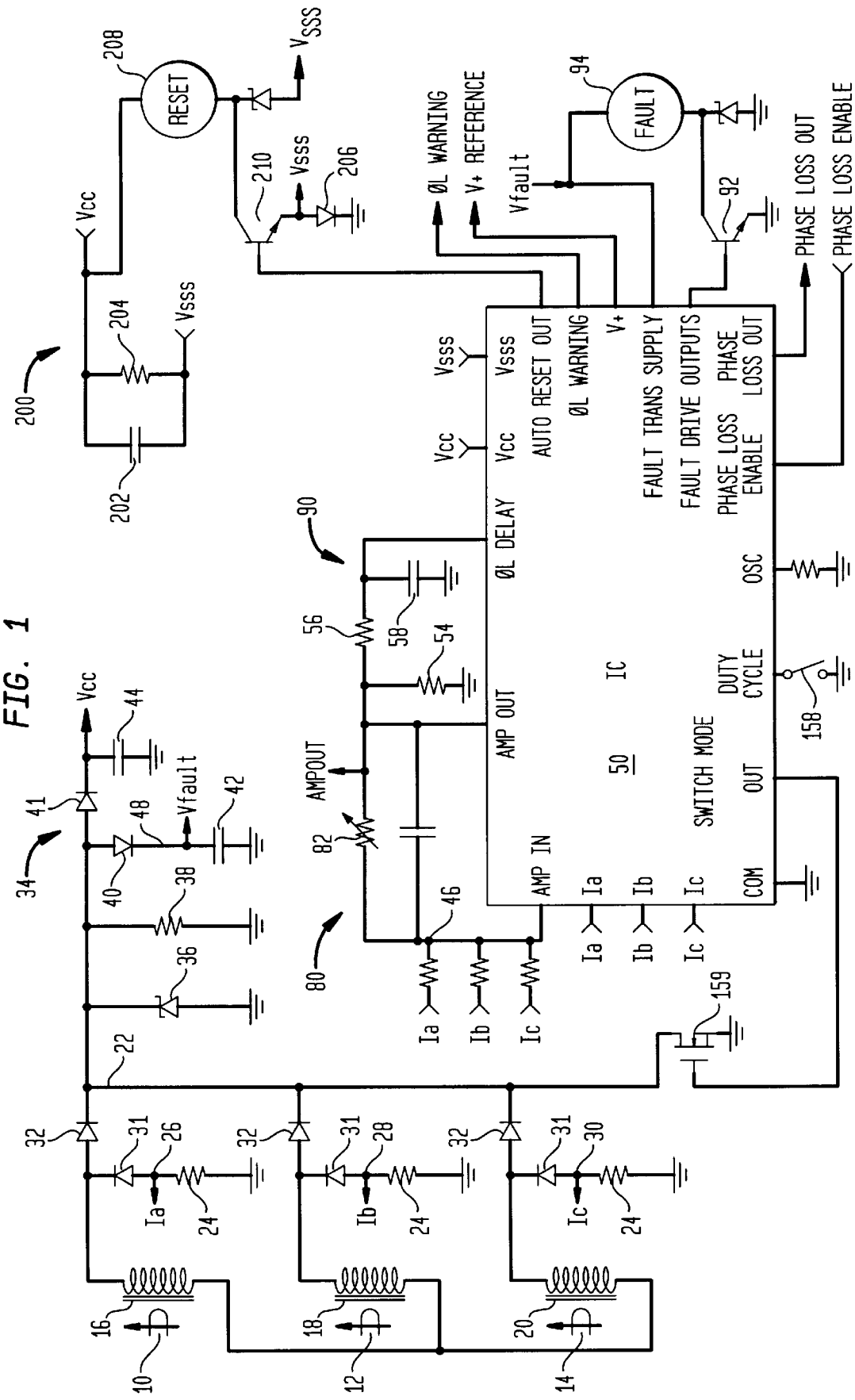
FIG. 1 is a schematic diagram of an overload relay made according to the invention.

An exemplary embodiment of an overload relay made according to the invention is illustrated generally in schematic form in FIG. 1. The same is generally intended to be coupled to a three-phase load, although its use is not limited thereto. Phase conductors are shown at 10, 12 and 14 and are connected to the load (not shown). Individual current transformers 16, 18 and 20 are respectively associated with the conductors 10, 12 and 14 and are connected in parallel via conductor 22.

Associated with each current transformer 16, 18 and 20, is a current sensing resistor 24. Located between each current transformer 16, 18 and 20 and its associated current sensing resistor 24, is a junction 26, 28 or 30 from which a signal representative of the current flowing through the associated phase may be taken. Diodes 31 and 32 serve as rectifiers for the signals for each of the phases such that a direct current signal is present on the line 22, which in turn is connected to a first power supply circuit, generally designated 34. An electrical clamp in the form of a zener diode 36 is located between the common node and the first power supply 34, specifically, between the rectifier defined by the diodes 31 and 32, and the first power supply 34.

The first power supply 34 includes a loading resistor 38 and a capacitor 44 to store voltage. A second power supply, generally designated 48, provides a second power source to power the fault circuitry during a fault (as described in further detail below). The second power supply includes diode 40 and capacitor 42 to store energy. The capacitor 44 of the first power supply 34 is isolated from the second power supply 42 via diode 41. As described in more detail below, this prevents the voltage stored in capacitor 44 from decaying too quickly during a fault.

Figure 2A:
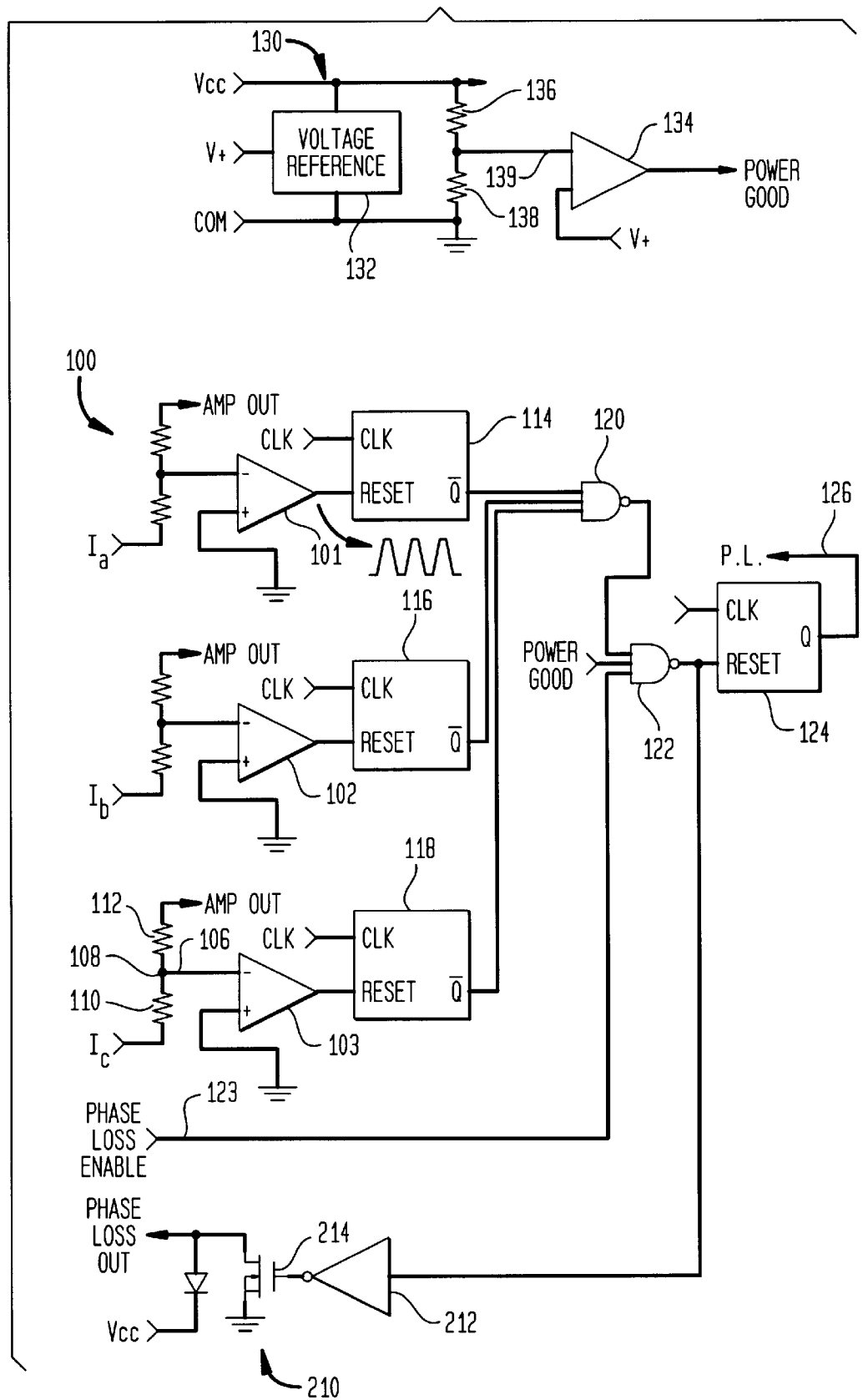
FIG. 2 is a block diagram of an integrated circuit made according to the present invention.
Figure 2B:
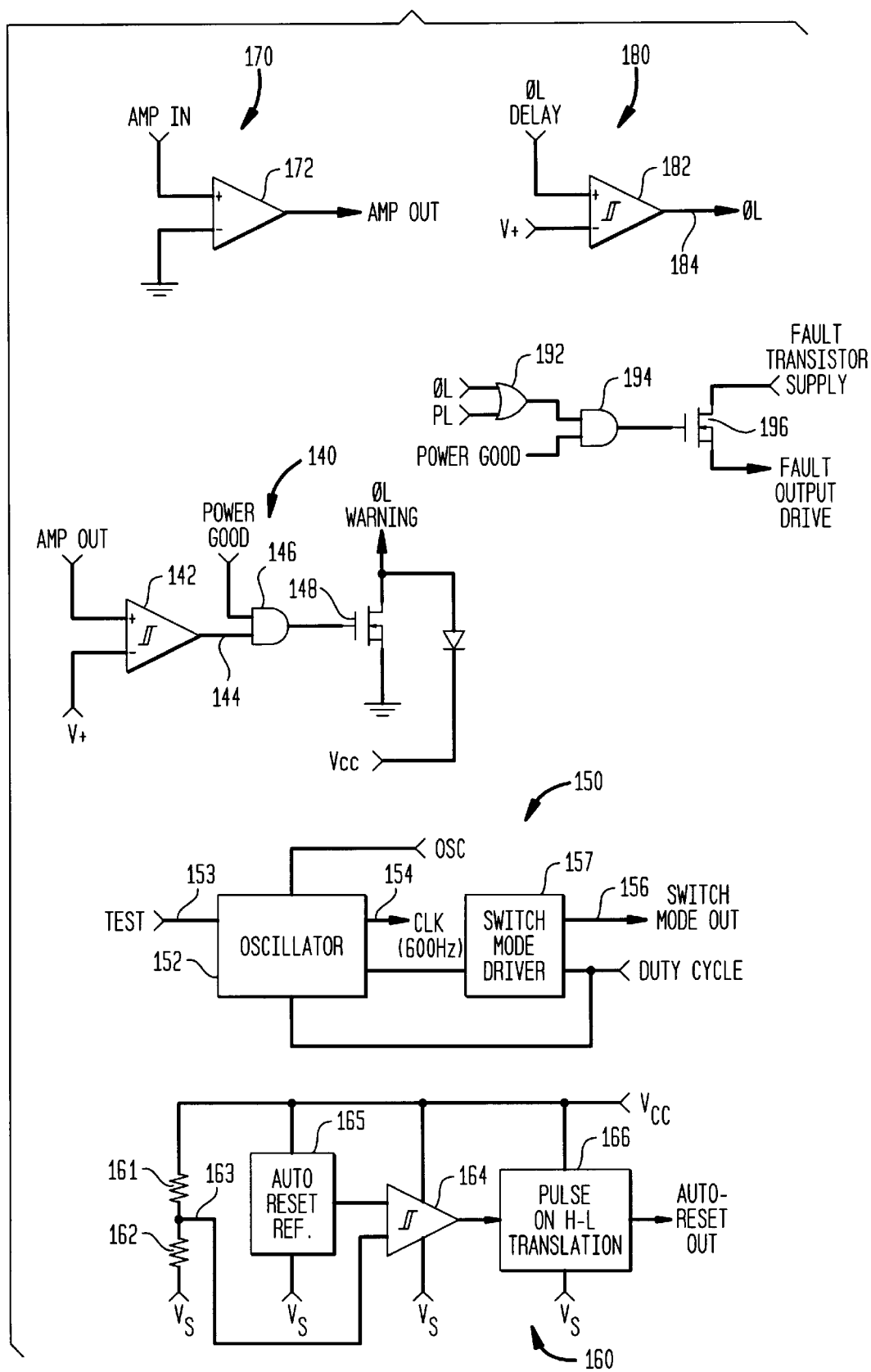

In the preferred embodiment, the relay includes an integrated circuit 50. As shown in FIG. 2, the integrated circuit 50 contains phase loss detection circuitry 100; under voltage lockout circuitry 130; an over load warning circuit 140; an oscillator circuit 150; an auto reset circuit 160; a three phase comparator circuit 180; and an output driver circuit 190.

The under voltage lockout circuit 130 includes a first section 132 which provides a reference voltage V+. This voltage is used as a reference voltage for the various components in FIGS. 1 and 2 having the designation V+. The lockout circuit 130 also includes a second section which includes a comparator 134 and voltage divider resistors 136 and 138. The resistors 136 and 138 are connected to receive power from the first power supply 34 and to derive a proportional voltage signal at reference numeral 139. Voltage signal 139 is provided to the comparator 134 for comparison with the reference voltage signal V+. The comparator 134 provides a "power good" signal whenever the voltage signal 139 is at or above a predetermined value and the reference voltage signal V+ is stable. The under voltage lockout circuit 130 is utilized to prevent false tripping of the overload relay when the reference signal is not stable. Under voltage lockout circuit 130 also ensures that capacitor 42 has enough energy to trip the solenoid.

The three phase amplifier 170 of the integrated circuit 50, which comprises inverting operational amplifier 172, works in conjunction with the discrete amplifier circuitry shown in FIG. 1, generally indicated by reference numeral 80. These devices are arranged to sum and amplify the signals from the junctions 26, 28 and 30. More particularly, signals from the junctions 26, 28 and 30, which are negative, are fed to a summing junction 46, which is connected as an input to the inverting operational amplifier 172 in the integrated circuit. The resulting positive output from the amplifier 172 will be proportional to the average current flowing on each of the conductors 10, 12 and 14. An adjustable feedback comprising potentiometer 82 is also connected between the summing junction 46 and the output to the amplifier 172. This allows the user to adjust the circuitry to trip the relay at a selected motor overload amperage.

As persons skilled in the art will appreciate due to the feedback arrangement of the amplifier 172, the value of the overload amperage setting is a reciprocal function of the potentiometer resistance. Therefore, as the resistance of the potentiometer decreases, the amperage setting increases, and vice versa. However, because amperage is a reciprocal function of resistance, when the resistance of the potentiometer is relatively low (and the amperage rating is relatively high), a small change in resistance has a large effect on the amperage setting. On the other hand, when the resistance of the potentiometer is relatively high (and the amperage rating is relatively low), a change in resistance has less of an effect on the amperage setting. Consequently, it is difficult to accurately set the potentiometer at higher amperage settings because small changes in the resistance result in substantial changes of the amperage setting. This is particularly true because solid state overload relays are usually small and compact, and therefore have small potentiometers.

Figure 3:
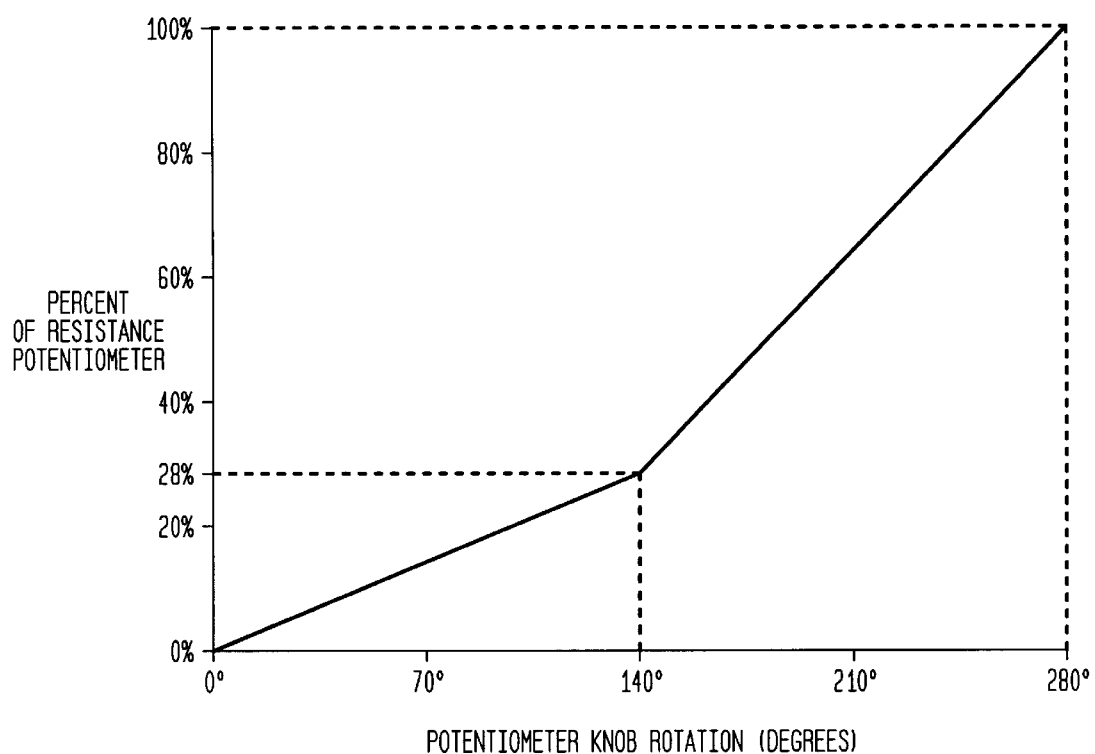
FIG. 3 is a graphical diagram of the resistance of a potentiometer versus potentiometer knob rotation made according to the invention.

To alleviate this problem, the potentiometer 82 preferably changes its resistance as it is adjusted so that it has a more linear effect on amperage settings. This allows the user to more accurately set the potentiometer 82 to a predetermined amperage setting, particularly at relatively higher amperage settings. FIG. 3 illustrates the preferred resistance of potentiometer 82 as a function of the potentiometer knob rotation. In this example, the knob can be rotated from a position of 0 degrees to a position of 280 degrees, and the resistance of the potentiometer increases as a function of knob rotation. However, unlike traditional potentiometers, as the knob is rotated, the resistance of potentiometer 82 increases at a first rate and then, at a predetermined position of knob rotation, changes to a second rate.

More particularly, and as illustrated on FIG. 3, the resistance of potentiometer 82 increases at one rate versus knob rotation up to about 140 degrees of knob rotation (which is about 50 percent of maximum rotation) and at another rate from about 140 degrees of knob rotation to 280 degrees of knob rotation. Consequently, when the knob of potentiometer 82 is turned about 50 percent of its maximum rotation, the resistance of the potentiometer has increased by less than 50 percent of its maximum. At that point, as the knob is turned beyond 50 percent, the resistance increases at a higher rate up to about 100 percent of its resistance. In contrast, traditional potentiometers typically have a single, linear rate of resistance during the entire knob rotation. The two-rate potentiometer 82 allows the user to more easily set specific overload rates via setting of the potentiometer knob, particularly towards the minimum resistance settings of the potentiometer (which corresponds to the maximum overload ratings of the relay).

Of course, persons skilled in the art will appreciate that the potentiometer 82 could be arranged to have other rates of resistance change versus knob rotation to achieve substantially the same effect, e.g., an exponential rate, a non-linear rate, multi-linear rates (beyond two), etc. The disclosed two-linear rate potentiometer is only by way of example. Similarly, the disclosed potentiometer with knob rotation of 0 to 280 degrees is also only by way of example, as any type of variable resistance can be used.

The output from the amplifier 172 is connected to an RC circuit made up of resistors 54 and 56 and capacitor 58, and then is input to the phase loss comparator circuit 180 in the integrated circuit. More particularly, this signal is input to an overload comparator 182 where it is compared to the voltage reference signal V+. The comparator 182 has hysteresis built in to prevent oscillation. The arrangement is such that when the signal indicative of the average current exceeds the reference voltage signal V+ by a predetermined amount, an overload signal will be issued on the output 184 of the overload comparator 182. The output 184 in turn is connected to the output driver circuit 190, specifically to the input of an OR gate 192, the output of OR gate 192 is connected in turn to the input of an AND gate 194 along with the input from the under voltage lockout circuit 130 indicating when the power level is good. If both conditions are present, the AND gate 194 provides an overload signal to turn on an output driver 196, which comprises a MOSFET. The output driver 196 is connected to and operates a transistor switch 92, which, in turn, is placed in series with a fault coil 94 and the second voltage supply.

Consequently, when the signal indicative of the average current exceeds the reference voltage signal V+ by a predetermined amount, and the power level is good, the fault coil is energized to mechanically trip the relay in a conventional manner. The MOSFET output driver 196 is used to provide a pulse to the transistor switch 92 of sufficient length to enable operation of the fault coil 94. Hysteresis in comparators 182 and 134 provide for a pulse width of sufficient length to assure tripping of the relay.

It should be observed that the RC circuit made up of the resistors 54 and 56 and the capacitor 58 provides a memory for determining if there has been a trip within a predetermined time period and causing the circuit to trip with greater rapidity if such has been the case. It also provides a delay to allow for brief overload conditions to occur, such as during startups when the load may draw excess power. The time constant of the RC circuit, including the resistors 54 and 56 and the capacitor 58, is relatively large so as to provide for a relatively slow discharge of the capacitor 58. Consequently, if there has been a previous trip shortly before that determined by another increase in the average current, the capacitor 58 will not be completely discharged and will more rapidly charge to the level that will ultimately trigger the MOSFET output driver 196. Clearly, the less the elapsed time between the present trip and the preceding trip, such as during repeat startings, the more rapidly the present trip will occur. This feature is designed to prevent overheating of the load as would be the case if the trip time remained constant in all circumstances. In such a case, trips occurring within a short time of one another would not permit sufficient cooling of the load, such that damage could result.

It should also be observed that when the fault coil is energized, the first and second power supplies are shorted via diode 40, capacitor 42 and the solenoid of the fault coil 94. Consequently, the voltage of the first power supply decays over time during the period when the fault coil is energized. When the first power supply voltage decays such that it becomes less than the reference voltage V+, the comparator 134 of the lockout circuit 130 lowers the power good signal. This condition is input to the AND gate 194 which, in turn, resets the output driver 196, which, in turn, resets the transistor switch 92 and deenergizes the fault coil 94. This keeps the output driver 196 from latching during an under voltage condition, which would cause the first power supply to be shorted, which could prevent the first power supply from ever reaching normal operating voltage.

The overload relay also provides a means for tripping when one or more phases is lost. That is to say, if power on one of the conductors 10, 12 or 14 ceases, that condition is sensed and will cause a trip independently of any corresponding increase in the two remaining operative phases.

More particularly, a series of three comparators 101, 102 and 103 in the phase loss detection circuit 100 are respectively connected to receive signals indicative of the sum of the current through the associated phase and the average current through all phases as illustrated in FIGS. 1 and 2. As can be appreciated from FIG. 2, the input to the comparator 103 is a conductor 106 which in turn is connected to a junction 108 of two resistors 110 and 112. The resistor 112 may be connected to the output of the operational amplifier 172 to receive the average current signal therefrom while the resistor 110 may be connected to the junction 30 to receive the signal representing current in the associated phase therefrom. Like conductors and resistors similarly connected provide inputs to the comparators 101 and 102.

The outputs from the comparators 101, 102 and 103 are connected to respective pulse extender circuits 114, 116 and 118. Preferably, the pulse extenders 114, 116 and 118 consist of digital timers. The outputs from the comparators 101, 102 and 103 are input to the reset inputs of the digital timers 114, 116 and 118. The digital timers are arranged so that when the reset input remains low, the timer begins a time out sequence and raises the non-inverted output (and lowers the inverted output) after a predetermined period of time, or, more particularly, after it receives a predetermined number of clock signals. If, during this interval, the timer receives a reset signal, the timer is reset and it restarts the time out sequence. The inverted output of the timer is a mirror. Consequently, it will be appreciated that, when phase is present in conductors 10, 12 and 14, pulse signals are output from comparators 101, 102 and 103. These pulse signals reset the digital timers 114, 116 and 118 which prevents the timers from completing a time out sequence. Consequently, the inverted outputs of the timers 114, 116 and 118 remain high.

The inverted outputs of digital pulse extenders 114, 116 and 118 are connected to the inputs of a NAND gate 120, which in turn is connected to a NAND gate 122 which also receives a signal from the under voltage lockout circuit 130 that indicates when power is good. Also illustrated in FIG. 2 is an optional phase loss enable signal 123. This optional signal is also input into NAND gate 122 and operates as a control signal.

The output from NAND gate 122 is input to the reset of phase loss timer 124. Preferably, phase loss timer 124 is a digital timer.

Thus, it will be appreciated that if any of the signals input to NAND gate 122 are low, a high signal is input to the reset input of timer 124, which prevents the timer from timing out, which causes the non-inverted output 126 of the timer 124 to remain low. Therefore, it will be appreciated that if the optional phase loss enable signal 123 is low, the timer 124 will receive a high reset signal and will be unable to raise its non-inverted output. The same is true if the power good signal is low. Similarly, if phase is present on conductors 10, 12, and 14, the output of NAND gate 120 remains low, which, in turn, causes the output of NAND gate 122 to remain high, which prevents the timer from timing out.

However, it will be appreciated that if phase is loss on one of the conductors 10, 12, or 14, the output from NAND gate 120 will be high. If the power good signal and the optional phase loss enable signal 123 are also high, a low reset signal is input to timer 124. This causes the timer to initiate its time out sequence, and, after a predetermined number of clock signals, will raise its non-inverted output 126. The digital timer 124 is arranged so that when the reset signal goes low, the non-inverted output 126 of the timer goes high after a predetermined interval of clock cycles, preferably after about 2 to 2.9 seconds after the reset signal goes low. This time period delay prevents nuisance tripping.

The non-inverted output 126 of timer 124 is input to output driver circuitry 190, specifically to the input of OR gate 192. As described above, the output of OR gate 192 is input to AND gate 194 along with the input from the under voltage lockout circuit 130 indicating when the power level is good. If both conditions are present, the AND gate 194 provides an overload signal to MOSFET output driver 196, which operates a transistor switch 92, which is placed in series with fault coil 94.

Consequently, when phase is loss in at least one of conductors 10, 12 or 14, and the phase remains loss for a period of time, preferably for about 2 to 2.9 seconds, the fault coil is energized to magnetically trip the relay in a conventional manner. Again, the MOSFET output driver 196 is used to provide a pulse to the transistor switch 92 of sufficient length to enable operation of the fault coil 94. Hysteresis in comparator 134 provides for a pulse width of sufficient length to assure tripping of the relay.

In the preferred embodiment, the pulse extenders 114, 116 and 118, as well as the phase loss timer 124, consist of digital timers in the integrated circuit rather than discrete RC circuit timers. Generally, digital timers are more accurate than RC timers, are less susceptible to changes in temperature and humidity, and are less likely to be contaminated during construction or use. In addition, digital timers can be implemented in an integrated circuit, which saves space and facilitates efficient and consistent construction. Consequently, the digital timers 114, 116, 118 and 124 in integrated circuit 50 provide for a reliable circuit in a small and inexpensive package.

Oscillator 152 in oscillator circuit 150 generates a clock signal 154. The clock signal 154 is input to each of the digital timers 114, 116, 118 and 124 to clock the timers in a conventional manner.

In the preferred embodiment, the overload relay contains an overload warning circuit, indicated generally by reference numeral 140, that provides a warning signal prior to the tripping of the relay. More particularly, the output from the amplifier 172, which is indicative of the average current flowing on each of the conductors 10, 12, and 14, is input to a comparator 142. This signal is compared to the reference signal V+, which is also input to the comparator 142. The arrangement is such that when the signal indicative of the average current exceeds the reference signal V+ by a predetermined amount, a signal will be output from the comparator 142, which, in turn, is connected to an input of an AND gate 146. The comparator contains hysteresis to prevent oscillation. The signal from the lockout circuit 130 indicating when the power level is good is also connected to an input of the AND gate 146. If both conditions are present, the AND gate 146 issues a signal to a gate of a MOSFET driver 148, which, in turn, completes a warning signal path to common. This warning signal path can be used to complete a signal path for an audible or visual alarm (not shown) in a conventional manner. This will provide the user with a prompt warning that an overload condition has occurred prior to the tripping of the relay, which may allow for corrective action to be taken.

A separate warning circuit during loss of phase is illustrated generally on FIG. 2 by reference numeral 210. More particularly, the output of NAND gate 122, which, as described above, is low during loss of phase on any of conductors 10, 12, or 14, is connected to inverter 212. Inverter 212 inverts the signal from NAND 122 and inputs this signal to the gate of MOSFET driver 214, which, in turn, completes a phase loss out signal path to common. This path to common can be used to complete a signal path for an audible or visual alarm (not shown) in a conventional manner. Consequently, when phase is loss on any of the conductors 10, 12 or 14, a phase loss out signal can be issued. This signal is issued prior to the delay imposed by phase loss timer 124. This will provide the user with a prompt warning that phase has been lost prior to tripping of the relay, which may allow for corrective action to be taken.

In one embodiment, the overload relay contains a power dump circuit, which consists of switch mode driver 157 in the oscillator circuit 150, duty cycle switch 158 and MOSFET 159. The switch mode driver 157 derives a duty cycle signal 156 from the oscillator 152. This duty cycle signal 156 is connected to the gate of MOSFET 159, which, in turn, is connected in series between the first power supply 34 and common. Consequently, when the duty cycle signal is high, the MOSFET is energized and the first power supply is shorted to common. This lowers the power dissipation in the zener diode 36, which, in turn, lowers overall power consumption of the relay and reduces the heat generated by the relay. The duty cycle signal of the switch mode driver 157 can be selectively changed by closing duty cycle switch 158. For example, the switch mode driver 157 can be arranged to provide a first duty cycle when the duty cycle switch 158 is left open and a second duty cycle when the duty cycle switch 158 is closed.

In addition, the duty cycle pin into the integrated circuit can also be connected to the oscillator 152 as illustrated in FIG. 2. The oscillator 152 can be arranged so that, during testing, the test input 153 can be connected to common which disables the standard clock signal 154. A separate, preselected clock signal can then be input via the duty cycle pin into oscillator 152 and this separate signal is then output on clock line 154 as a test clock signal.

It will be appreciated that the power dump circuitry and test clock circuitry of the present invention are primarily contained within the integrated circuit. This allows for digital implementation of these devices, which saves space, reduces the number of components, and facilitates efficient and reliable construction.

In the preferred embodiment, the relay includes an automatic reset circuit, indicated generally by reference numerals 160 and 200. As shown in FIG. 1, the first power supply is connected to an RC timing circuit, indicated by capacitor 202 and resistor 204. During normal operation, the capacitor 202 stores a voltage proportional to the first supply voltage. After an overload trip condition, the voltage established on capacitor 202 decays through resistor 204. Diode 206 establishes a separate common for the auto reset circuit. This allows the automatic reset circuitry 160 and 200, to operate independently of the other relay circuitry, for example the circuitry connected between the first supply voltage and common.

The circuitry indicated generally by reference numeral 160 provides a pulse when the voltage established by capacitor 202 decays below a reference voltage. This pulse is used to latch a reset coil 208. More particularly, the voltage on capacitor 202 is voltage divided by resistors 161 and 162. This establishes a voltage signal at junction 163 that is proportional to the voltage across capacitor 202. The voltage established at junction 163 is input to a comparator 164. Also, an automatic reset reference voltage is established by reference circuitry 165, and this reference voltage is also input to the comparator 164 for comparison with the voltage established at junction 163. When the voltage at junction 163 decays below the reference voltage, the comparator 164 outputs a signal to pulse generator 166, which, in turn, outputs a pulse signal to transistor switch 210, which is placed in series with reset coil 208. Consequently, when the transistor switch 210 receives a pulse from pulse generator 166, it completes a signal path from capacitor 202 through the reset coil 208 to Vsss. This latches the reset coil 208 which resets the relay. Accordingly, it will be appreciated that, during a fault, the voltage across capacitor 202 decays over a period of time which will, in turn, lead to the resetting of the relay.

From the foregoing, it will be appreciated that an overload relay made according to the invention eliminates any need for heaters, the volume to house the same or any means to dissipate heat therefrom. Furthermore, the same provides for tripping in the event of a phase loss independently of any increase in current levels to the remaining operative phases so as to allow rapid disconnection before any part of the load can overheat.

It will also be appreciated that the digital timers 114, 116, 118, and 124 provide highly accurate timing functions, which, in turn, provide for a reliable and compact electrical relay that is less susceptible to fluctuations in heat and humidity. Moreover, the overload loss warning circuit 140 provides a warning signal prior to tripping of the relay. It will appreciated that this warning signal can be used to warn a user prior to shutting down of the load so that counter measures could be taken if desired. In addition, auto reset circuit, indicated generally by reference numeral 160 and 200, provide for automatic resetting of the relay after a trip. It will be appreciated that this may eliminate the need for manual resetting of the relay by a user.

In some instances, it is desirable to use the present invention in harsh environments, such as in high temperature environments. Therefore, the capacitors used in the present invention should be constructed to withstand, and operate accurately, at higher temperatures. This also provides a further benefit in that, if the relay of the present invention is used in a certain temperature range with capacitors rated at higher temperatures, the capacitors will have a substantially longer lifespan than capacitors rated at lower temperatures. This is because capacitor life ratings are typically a function of rated voltage and temperature, and capacitors that are operated at voltages and temperatures lower than rated values significantly increase their lifespans.

In fact, in the preferred embodiment, the overload relay of the present invention uses capacitors rated at 105 degrees Celsius. This provides for accurate operation even in high temperature environments (e.g., around 85 degrees Celsius), and provides for a substantially longer lifespan of the capacitors. Similarly, the capacitors used in the present invention are preferably rated at voltages of 25 volts DC, even though the voltages applied to the capacitors of the present invention are generally in the range of about 14.5 volts DC. This, again, reduces failure rates and substantially extends the lifespan of the capacitors.

In order to increase the durability and lifespan of the circuit boards and electrical components used in the overload relay, the boards and components may be dipped or coated with a protective coating, such as silicone or polyurethane.

Finally, while the invention has been described as being an overload protector for a multiple phase load, those skilled in the art will appreciate that the same may find utility in single phase load protection. In such a case, it is only necessary to pass a single phase conductor through the three current transformers 16, 18, and 20 to achieve the benefits of the invention as far as overload protection is concerned.

What is claimed is:

1. A monitoring device coupled to phase conductors, the phase conductors being coupled to a load though a relay, the relay having a connect coil and a disconnect coil, the monitoring device comprising:

a current sensing circuit for providing signals representative of the current signals in each of the phase conductors;

a first switch for controlling the disconnect coil, the disconnect coil capable of disconnecting the phase conductors from the load;

a second switch for controlling the connect coil, the connect coil capable of connecting the phase conductors to the load;

a fault determining circuit connected to the current sensing circuit, the fault circuit actuating the first switch in response to at least one predetermined condition of at least one of the current signals; and a reset circuit for automatically actuating the second switch after the first switch is actuated.

2. The monitoring device of claim 1 further comprising:

a first circuit coupled to the current sensing circuit for providing a first reference signal; and the reset circuit connected to receive the first reference signal and actuate the second switch when the first reference signal reaches a predetermined value.

3. The monitoring device of claim 2 further comprising:
a second circuit coupled to the first circuit, the second circuit providing the power used to actuate the first switch.

4. The monitoring device of claim 2, wherein the reset circuit comprises an RC timing circuit.

5. The monitoring device of claim 4, wherein the RC timing circuit has a capacitor rated to operate up to 105 degrees Celsius and 25 volts DC.

6. The monitoring device of claim 4, wherein the RC timing circuit is protectively coated.

7. The monitoring device of claim 2, wherein the fault determining circuit comprises digital pulse extenders.

8. The monitoring device of claim 7, wherein the predetermined condition is loss of phase.

9. A self-powered, solid state overload relay for monitoring the phase inputs of a load, the relay comprising:
a first coil;
a second coil, the first coil opens the relay in response to a first signal, the second coil closes the relay in response to a second signal;
a control circuit coupled to the first coil, the control circuit providing the first signal in response to a fault condition in at least one of the inputs to the load; and
a reset circuitry coupled to the second coil, the reset circuit automatically providing the second signal in response to the provision of the first signal.

10. The self-powered, overload of claim 9 wherein the control circuit further comprises a voltage determining circuit coupled to the first coil, the voltage determining circuit providing the first signal under predetermined conditions.

11. The self-powered, overload relay of claim 9 wherein the voltage determining circuit is protectively coated.

12. The self-powered, overload relay of claim 9 further comprising;
a plurality of current sensing transducers coupled to the phase inputs;
a reference circuit coupled to at least one of the current sensing transducers, the reference circuit providing a reference signal;
the reset circuit including a comparator, the comparator issuing the second signal when the reference signal reaches a predetermined value; and
wherein the second coil is coupled to the comparator.

13. The self-powered overload relay of claim 12 further comprising;
a potentiometer for setting the value of an unacceptable increase of current in at least one of the inputs to the load; and
wherein the fault is the unacceptable increase of current and the potentiometer has a resistance that varies at multiple linear rates.

14. The self-powered overload relay of claim 12 further comprising;
a potentiometer for setting the value of an unacceptable increase of current in at least one of the inputs to the load; and
wherein the fault is the unacceptable increase of current and the potentiometer has a resistance that varies at a non-linear rate.

15. A monitoring device coupled to at least one phase conductor, the conductor supplying power to an induction machine, the monitoring device comprising:
a current sensing means for providing signals representative of the current signal in each of the phase conductors;
a first electromagnetic means for electrically disconnecting the phase conductors from the machine;
a second electromagnetic means for electrically connecting the phase conductor to the machine;
fault determining means for causing the first electromagnetic means to disconnect the phase conductor from the machine in response to at least one predetermined condition of at least one of the current signals; and
reset means for causing the second electromagnetic means to connect the phase conductors to the machine after the phase conductors are disconnected.

16. The monitoring device of claim 14 further comprising:
a summing means for providing a signal related to the average current in each of the phase conductors; and
a warning means for comparing the signal related to the average current in each of the phase conductors to a reference signal, and issuing a warning signal when the signal related to the average current in each of the phase conductors is greater than the reference signal.

17. The monitoring device of claim 14 wherein the condition is an over voltage, a loss of phase, an unacceptable current, or an unacceptable current increase condition.

18. The monitoring device of claim 15 wherein the phase conductors are connected to the machine through electromagnetically controlled contacts.

19. The monitoring device of claim 15 wherein the reset means includes a delay circuit.

20. The monitoring device of claim 15 wherein the fault determining means is a software controlled circuit.

* * * * *